7483X
COUCH & FRARY.
Lamp.
Patented March 13, 1833.
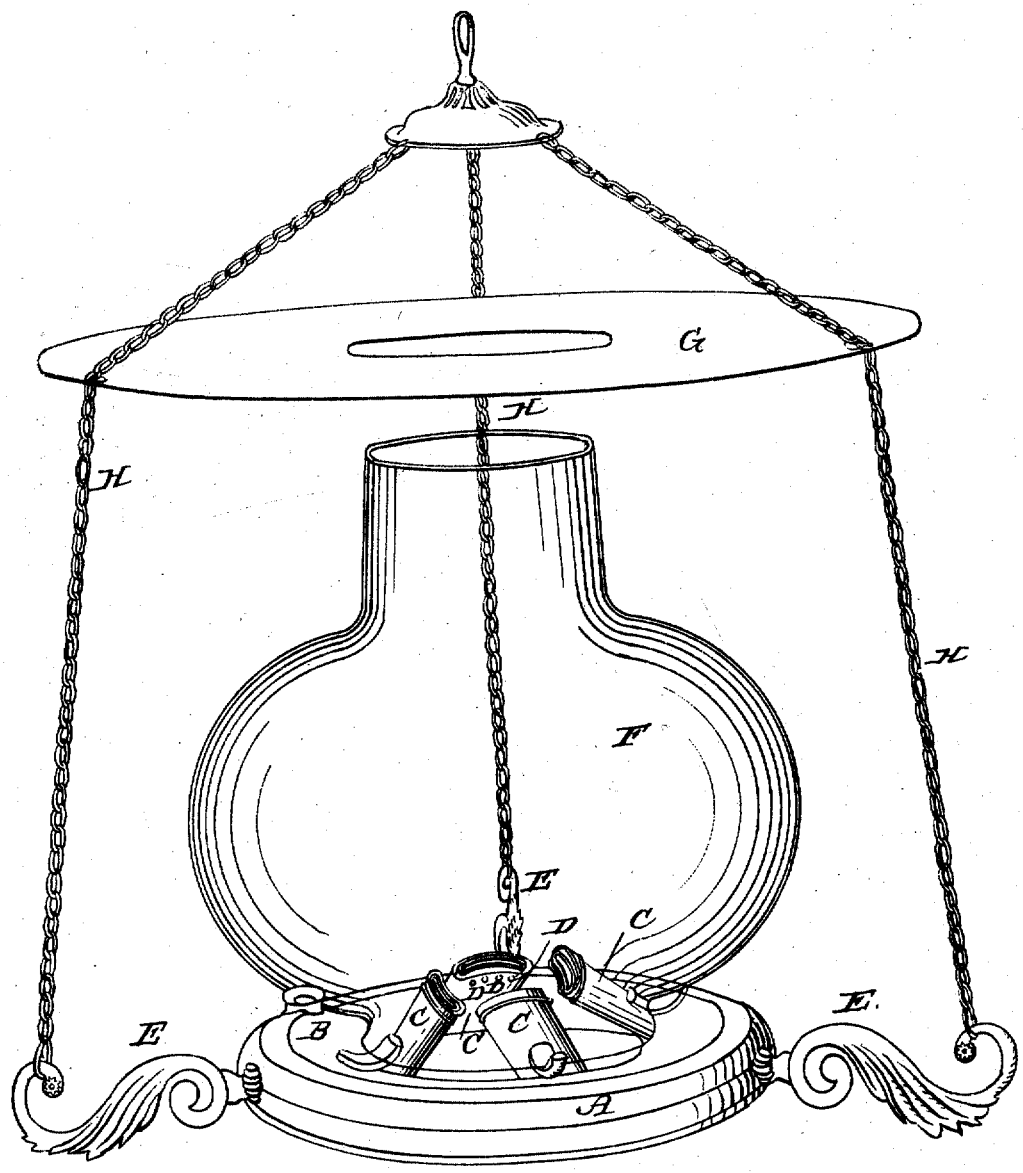

7483X March 13, 1833 [illegible] 339.

Ira Couch & James A. Frary
Letters Patent

The Schedule referred to in these Letters Patent and making part
of the same containing a description in the words of the said Ira Couch
& James A. Frary themselves of their improvement in Lamps for
suspension called Couch & Frary's Barrel Lamp

---

Be it known that we Ira Couch & James A Frary both of Meriden
in New Haven County & State of Connecticut & both native born Citi
zens of the United States have invented a new & useful improvement
in Lamps for suspension called "Couch & Frary's "Barrel Lamp"
& that the following is a full & exact description of the construction &
operation of the same as invented & improved by us. The body of the
Lamp is a circular barrel in the shape of a hollow circular tube or hoop
about seven inches in diameter from out side to outside & on the in
side a little short of four inches. When suspended the horizontal diam
eter of the hollow circle or tube forming the barrel is about one and a
half inch from outside to outside the perpendicular diameter is about
one quarter of an inch less so that deducting the thickness of the shell
the hollow of the circular barrel will be a little more than one inch
in diameter extending round an open circle of about four inches in di
ameter. This circular barrel is designed for the reception of oil & will
hold about one pint extending freely all round the circle. It is made
of block tin or other suitable material in halves in a circular mould made
to the shape of half the circular barrel in two castings the top & bottom
being alike & are then pasted or soldered together so as to form the bar
relled circle. On the top of the barrel is inserted a filler tube with a
screw top for supplying the barrel with oil & on the inner circle of the
barrel are inserted four tubes for wicks opening into the circular barrel
about 1/4 of an inch & rising about 1/2 inch inclining towards the centre
in an angle of about 30 degrees leaving an open space between the wicks
of about two inches in diameter. These tubes are of tin soldered or pasted
into

[illegible]

74837 into the circular barrel on the inner side of the circle each forming an opening for a wick about one inch broad & 1/8 of an inch thick with suitable openings on the [illegible] side for raising or moving the wicks on the outside of the circular barrel are placed at equal distances three scrolls or handles each about 3 1/2 inches long by which the Lamp may be suspended. Over the barrel Lamp thus made, when suspended a globular glass is placed resting on the barrel to guard the blaze of the wicks from the wind & above that & encircling the neck thereof is a bright tin reflector supported by the suspending chains in the usual manner. The advantages of this mode of constructing the lamp over any other heretofore invented are that the mass of oil is brought nearer the blaze of the wicks & they will therefore continue to burn freely till the whole is exhausted. The orifice of the circular opening is also larger & the downward light is less interrupted than in any other and is thereby increased by the full force of the reflector. We do not claim as our invention the central opening merely for a downward light that has long been known & used, but we do claim as our invention the circular barrel as above specified & described & the peculiar form & construction of our Lamp as above described, forming a Lamp upon a new construction & altogether superior to any other now in use more especially when a downward light is required & for this they solicit Letters Patent &c. In testimony whereof we have hereunto set our hands in New Haven this 11th day of February A.D. 1833

Witnesses
Ebenezer Baldwin
Simeon Baldwin

Ira Couch
James A Gray

Exd.
Ch.f.W.

756 [illegible]

(Patented March 13. 1833.)
(See in port folio)